(12) United States Patent
Lin

(10) Patent No.: US 11,153,048 B2
(45) Date of Patent: Oct. 19, 2021

(54) METHOD FOR IMPLEMENTING DATA MAPPING AND TRANSMISSION AND RELATED PRODUCT

(71) Applicant: GUANGDONG OPPO MOBILE TELECOMMUNICATIONS CORP., LTD., Guangdong (CN)

(72) Inventor: Yanan Lin, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/696,797

(22) Filed: Nov. 26, 2019

(65) Prior Publication Data

US 2020/0099487 A1    Mar. 26, 2020

Related U.S. Application Data

(63) Continuation of application No. PCT/CN2017/087259, filed on Jun. 6, 2017.

(51) Int. Cl.
*H04L 5/00* (2006.01)

(52) U.S. Cl.
CPC .......... *H04L 5/0044* (2013.01); *H04L 5/0005* (2013.01)

(58) Field of Classification Search
CPC .............. H04L 5/0055; H04L 1/1812; H04L 5/0053; H04L 1/1861; H04W 72/042
See application file for complete search history.

(56) References Cited

U.S. PATENT DOCUMENTS

| 9,602,235 | B2 | 3/2017 | Roh et al. |
| 2012/0155398 | A1 | 6/2012 | Oyman |
| 2015/0381209 | A1 | 12/2015 | Roh et al. |
| 2019/0312678 | A1* | 10/2019 | Yokomakura ............ H04L 1/00 |

(Continued)

FOREIGN PATENT DOCUMENTS

| CN | 101282122 A | 10/2008 |
| CN | 100581147 C | 1/2010 |

(Continued)

OTHER PUBLICATIONS

International Search Report in the international application No. PCT/CN2017/087259, dated Oct. 30, 2017.

(Continued)

*Primary Examiner* — Jung H Park
(74) *Attorney, Agent, or Firm* — Ladas & Parry LLP

(57) ABSTRACT

A method for implementing data mapping and transmission includes that: data to be transmitted is segmented into N code blocks, the N code blocks are divided into M code block groups (CBGs), and a difference between numbers of code blocks in any two CBGs being less than or equal to a preset value, and the M CBGs are mapped and transmitted on at least one transmission unit. The M CBGs include a first CBG and a second CBG, and a value of a parameter of information amount of the first CBG and a value of a parameter of information amount of the second CBG satisfy a preset condition; and the at least one transmission unit includes a first physical resource corresponding to the first CBG and a second physical resource corresponding to the second CBG, and the first physical resource is ahead of the second physical resource in time domain.

8 Claims, 6 Drawing Sheets

(56) References Cited

U.S. PATENT DOCUMENTS

| | | | | |
|---|---|---|---|---|
| 2019/0356430 | A1* | 11/2019 | Cheng | H04L 1/1614 |
| 2019/0379489 | A1* | 12/2019 | Hwang | H04L 1/00 |
| 2020/0036482 | A1* | 1/2020 | Park | H04L 1/18 |
| 2020/0044768 | A1* | 2/2020 | Yoshimura | H04L 1/1835 |
| 2020/0045725 | A1* | 2/2020 | Mochizuki | H04W 16/28 |

FOREIGN PATENT DOCUMENTS

| | | |
|---|---|---|
| CN | 102546102 B | 12/2014 |
| CN | 104283630 A | 1/2015 |
| CN | 104283651 A | 1/2015 |
| CN | 103621161 B | 5/2017 |
| CN | 106656440 A | 5/2017 |
| RU | 2298878 C2 | 5/2007 |
| WO | 2017019193 A1 | 2/2017 |

OTHER PUBLICATIONS

English abstract of the Written Opinion of the International Search Authority in the international application No. PCT/CN2017/087259, dated Oct. 30, 2017.
First Office Action in corresponding Taiwanese application No. 107117628, dated Jan. 31, 2020.
Nokia et al.: "Code block segmentation of eMBB", 3GPP Draft: R1-1708626 CB Segmentation, 3rd Generation Partnership Project (3GPP), Mobile Competence Centre: 650, Route Deslucoles: F-06921 Sophia-Antipolis Cedex France vol. RAN WG1, No. Hangzhou; May 15, 2017-May 19, 2017 May 14, 2017 (May 14, 2017), XP051274009, Retrieved from the internet: URL: hitp://www.3gpp.org/ftp/Meetings 3GPP SYNC/RAN1/Docs/ [retrieved on May 14, 2017] * the whole document * .
Ericsson: "Code Block Segmentation", 3GPP DRAFT; R1-1707065 Code Block Segmentaton, 3rd Generation Partnership Project (3GPP), Mobile Competence Centre; 650, Route Des Lucioles ; F-06921 Sophia-Antipolis Cedex; France, vol. RAN WG1, No. Hangzhou; May 15, 2017-May 19, 2017 May 14, 2017 (May 14, 2017), XP051272294, Retrieved from the internet: URL: http://www.3gpp.org/ftp/Meetings 3GPP SYNC/RAN1/Docs (retrieved on May 14, 2017) * the whole document *.
NTT Docomo et al.: "CBG constructior", 3GPP Draft; R1-1708483. 3rd Generation Partnership Project (3GPP), Mobile Competence Centre; 650. Route Des Lucioles; F-06921 Sophia-Anti Polis Cedex France vol. Ran WG1, No. Hangzhou; May 15, 2017-May 19, 2017 May 14, 2017 (May 14, 2017), XP051273675, Retrieved from the internet: URL: http://www.3gpp. org/ftp/Meetings 3GPP SYNC/RAN1/Docs/ [retrieved on May 14, 2017] * the whole document *.
Mediatek Inc: "Discussion on CB qroupin principles far CBG-based transmission with single/muiti-bit HARQ-ACK feedback", 3GPP Draft; R1-1707851 Discussion on CB Grouping Principles for CBG-Based Transmission With Single or Multi-Bit HARQ-ACK Feedback Final., 3rd Generation Partnership Project (3GPP), Mobile Competence CE vol. RAN WG1. No. Hangzhou: May 15, 2017-May 19, 2017 May 14, 2017 (May 14, 2017), XP051283965, Retrieved from the internet: URL: http://www.3gpp. org/ftp/Meetings 3GPP SYNC/RAN1/.
Supplementary European Search Report in the European applicalion No. 17912503.4, dated May 20, 2020.
ZTE: [88b-13] Summary Email discussion on: "CBG based retransmission, Transmission/retransmission of preempted data before/after ACK NACK feedback, Preemption indication for N"; 3GPP TSG RAN WG1 Meeting #89 R1-1709148 Hangzhou, China, May 16, 2017.
"WF on CB grouping for CBG based HARQ"; 3GPP TSG RAN WG1 Meeting #89 Hangzhou, P.R. China May 19, 2017 R1-1709728.
First Office Action of he Russian application No. 2019143053, dated Jul. 15, 2020.
Written Opinion of the international Search Authority in the international application No. PCT/CN2017/087259, dated Oct. 30, 2017.
First Office Action of the Chinese application No. 201911320568.0, dated Nov. 3, 2020.
First Office Action of the Chilean application No. 201903559, dated Dec. 16, 2020.
Office Action of the Indian application No. 201917050200, dated Feb. 3, 2021.
First Office Action of the Canadian application No. 3064967, dated Feb. 26, 2021.
Written Opinion of the Singaporean application No. 11201911215U, dated Apr. 13, 2021.
ZTE, "CBG based transmissions", 3GPP TSG RAN WG1 Meeting #89 R1-1707176, Hangzhou, China, May 15-19, 2017.
Guangdong OPPO Mobie Telecom, Discussion on CBG-based transmission', 3GPP TSG RAN WG1 Meeting #89 R1-1707725. Hangzhou, P.R. China May 15-19, 2017.
First Office Action of the Japanese application No. 2019-566119, dated Aug. 17, 2021.
First Office Action of the Korean application No. 10-2019-7036107, dated Jul. 12, 2021.

* cited by examiner

METHOD FOR IMPLEMENTING DATA MAPPING AND TRANSMISSION AND RELATED PRODUCT

CROSS-REFERENCE TO RELATED APPLICATION

This application is a U.S. continuation application of International Application No. PCT/CN 2017/087259, entitled "METHOD FOR DATA TRANSMISSION BY MAPPING AND RELATED PRODUCT", filed on Jun. 6, 2017, the disclosure of which is hereby incorporated by reference in its entirety.

TECHNICAL FIELD

The disclosure relates to the technical field of communications, and particularly to a method for implementing data mapping and transmission and a related product.

BACKGROUND

5th-generation (5G) new radio (NR) is a subject raised recently by the 3rd generation partnership project (3GPP). With the in-depth discussion about a 5G technology, on one hand, because of backward compatibility of a communication system, a new technology researched and developed later tends to be compatible with a technology which has been standardized before; and on the other hand, because of existence of numerous existing designs for 4th generation (4G) mobile communication long term evolution (LTE), flexibility of 5G may inevitably be sacrificed for compatibility to further bring reduction in performance. Therefore, researches in the two directions are concurrently made by the 3GPP at present. Herein, the technical discussion group not considering backward compatibility is called 5G NR.

In an LTE system, a transport block (TB) refers to a data block including a media access control (MAC) protocol data unit (PDU). The TB may be transmitted in a transmission time interval (TTI), and is also a unit for data retransmission in hybrid automatic repeat request (HARQ). It is specified in the LIE system that, for each terminal no more than two TBs may be transmitted in one TTI. A TB in the LTE system may be divided into multiple relatively small code blocks, and each code block is independently encoded. After any code block is failed to be decoded, a receiver feeds back a piece of unified acknowledgement (ACK)/negative acknowledgement (NACK) information to a sender, and the sender will retransmit the whole TB.

For improving transmission efficiency, it has been determined in a 5G NR system that code block group (CBG)-based feedback and retransmission is supported. Herein, a TB includes at least one CBG, and a CBG includes at least one code block. A sender is only required to retransmit a code block in a CBG which has failed to be decoded, and is not required to retransmit the whole TB.

SUMMARY

The aspects of the disclosure provide a method for implementing data mapping and transmission, a sender and a receiver.

A first aspect of the disclosure provides a method for implementing data mapping and transmission, which includes the following operations.

Data to be transmitted is segmented into N code blocks, and the N code blocks are divided into M CBGs. Here, a difference between numbers of code blocks in any two CBGs is less than or equal to a preset value, N and M are positive integers, N is greater than or equal to M, and M is greater than or equal to 2.

The M CBGs are mapped to at least one transmission unit and the M CBGs are transmitted on the at least one transmission unit. Here, the M CBGs include a first CBG and a second CBG, and a value of a parameter of information amount of the first CBG and a value of a parameter of information amount of the second CBG satisfy a preset condition. The at least one transmission unit includes a first physical resource corresponding to the first CBG and a second physical resource corresponding to the second CBG, and the first physical resource is ahead of the second physical resource in time domain.

A second aspect of the disclosure provides a method for implementing data mapping and transmission, which includes the following operations.

M CBGs mapped to at least one transmission unit are received. Herein, the M CBGs are obtained by dividing N code blocks, the N code blocks are Obtained by segmenting, data to be transmitted, a difference between numbers of code blocks in any two CBGs is less than or equal to a preset value, the M CBGs include a first CBG and a second CBG, and a value of a parameter of information amount of the first CBG and a value of a parameter of information amount of the second CBG satisfy a preset condition; the at least one transmission unit includes a first physical resource corresponding to the first CBG and a second physical resource corresponding to the second CBG, and the first physical resource is ahead of the second physical resource in time domain, N and M are positive integers, N is greater than or equal to M, and M is greater than or equal to 2.

Each of the M CBGs is decoded after the respective CBG is received.

A third aspect of the disclosure provides a sender, which includes a processor, a memory, a radio frequency chip and a program. The memory is configured to store the program. The processor is configured to execute the program to: segment data to be transmitted into N code blocks, and divide the N code blocks into M code block groups (CBGs), where a difference between numbers of code blocks in any two CBGs is less than or equal to a preset value, N and M are positive integers, N is greater than or equal to M, and M is greater than or equal to 2. The radio frequency chip is configured to map the M CBGs to at least one transmission unit, and transmit the M CBGs on the at least one transmission unit. The M CBGs include a first CBG and a second CBG, and a value of a parameter of information amount of the first CBG and a value of a parameter of information amount of the second CBG satisfy a preset condition; and the at least one transmission unit includes a first physical resource corresponding to the first CBG and a second physical resource corresponding to the second CBG, and the first physical resource is ahead of the second physical resource in time domain.

A fourth aspect of the disclosure provides a receiver, which includes a processor, a memory, a communication interface and a program. The memory is configured to store the program. The communication interface is configured to: receive M code block groups (CBGs) mapped to at least one transmission unit, where the M CBGs are obtained by dividing N code blocks, the N code blocks are obtained by segmenting data to be transmitted, a difference between numbers of code blocks in any two CBGs is less than or equal to a preset value, the M CBGs include a first CBG and a second CBG, and a value of a parameter of information amount of the first CBG and a value of a parameter of information amount of the second CBG satisfy a preset condition; the at least one transmission unit includes a first physical resource corresponding to the first CBG and a second physical resource corresponding to the second CBG, and the first physical resource is ahead of the second physical resource in time domain, N and M are positive integers, N is greater than or equal to M, and M is greater than or equal to 2. The processor is configured to decode each of the M CBGs after the respective CBG is received.

BRIEF DESCRIPTION OF DRAWINGS

The drawings required to be used for descriptions about the implementations or a related art will be simply introduced below.

DETAILED DESCRIPTION

Figure 1:
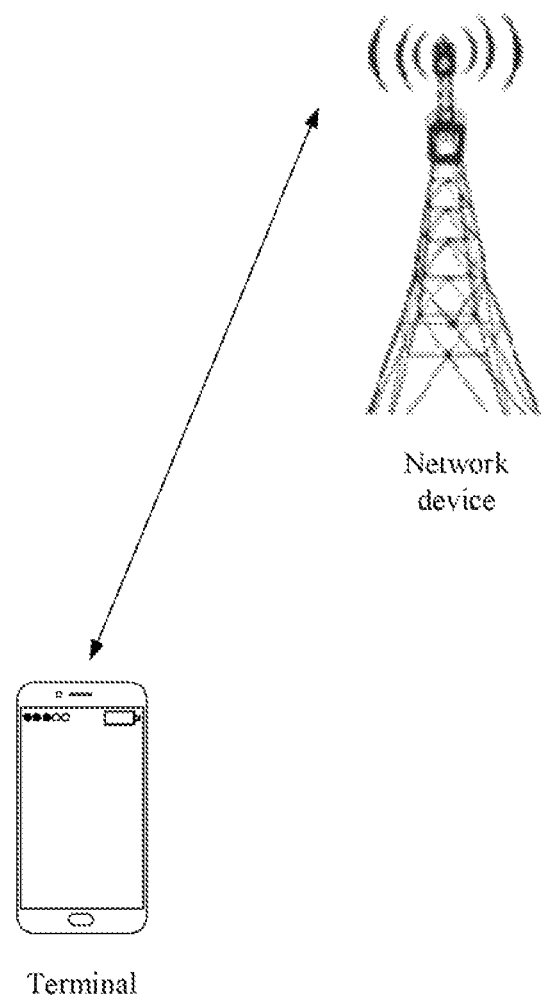
FIG. 1 illustrates a network architecture of a communication system according to an implementation of the disclosure.

FIG. 1 illustrates a network architecture of a communication system according to an implementation of the disclosure. The communication system may be, for example, a global system for mobile communications (GSM), a code division multiple access (CDMA) system, a time division multiple access (TDMA) system, wideband code division multiple access (WCDMA) system, a frequency division multiple access (FDMA) system, an orthogonal frequency-division multiple access (OFDMA) system, a single carrier FDMA (SC-FDMA) system, a general packet radio service (GPRS) system, a long term evolution (LTE) system, a 5G NR system and other similar communication systems. The communication system specifically includes a network device and a terminal. When the terminal accesses a mobile communication network provided by the network device, the terminal forms a communication connection with the network device through a wireless link. Such a communication connection Manner may be a single-connection manner or a dual-connection manner or a multi-connection manner. When the communication connection manner is the single-connection manner, the network device may be an LTE base station or an NR base station (also called a gNB). When the communication manner is the dual-connection manner (which may specifically be implemented by a carrier aggregation (CA) technology or implemented by multiple network devices), and when the terminal is connected with the multiple network devices, the multiple network devices include a master eNodeB (MeNB) and a secondary eNodeB (SeNB). Data is transmitted between eNodeBs through backhauls. The MeNB may be art LTE base station and the SeNB may be an LTE base station. Or, the MeNB may be an NR base station and the SeNB may be an LTE base station. Or, the MeNB may be an NR base station and the SeNB may be a NR base station.

In the implementations of the disclosure, terms "network" and "system" are often used interchangeably and their meanings may be understood by those skilled in the art. A terminal involved in the implementations of the disclosure may include various handheld devices, vehicle-mounted devices, wearable devices, computing devices or other processing devices connected to wireless modems, which have a wireless communication function, as well as user equipment (UE), mobile stations (MSs), terminal devices and the like in various forms. For convenient description, the devices mentioned above are collectively referred to as terminals.

A sender described in the implementations of the disclosure may be a network device and, correspondingly, a receiver is a terminal. Or, the sender may be a terminal and, correspondingly, the receiver is a network device. There are no limits made herein.

The technical solutions in the implementations of the disclosure will be described below in combination with the drawings in detail.

Figure 2:
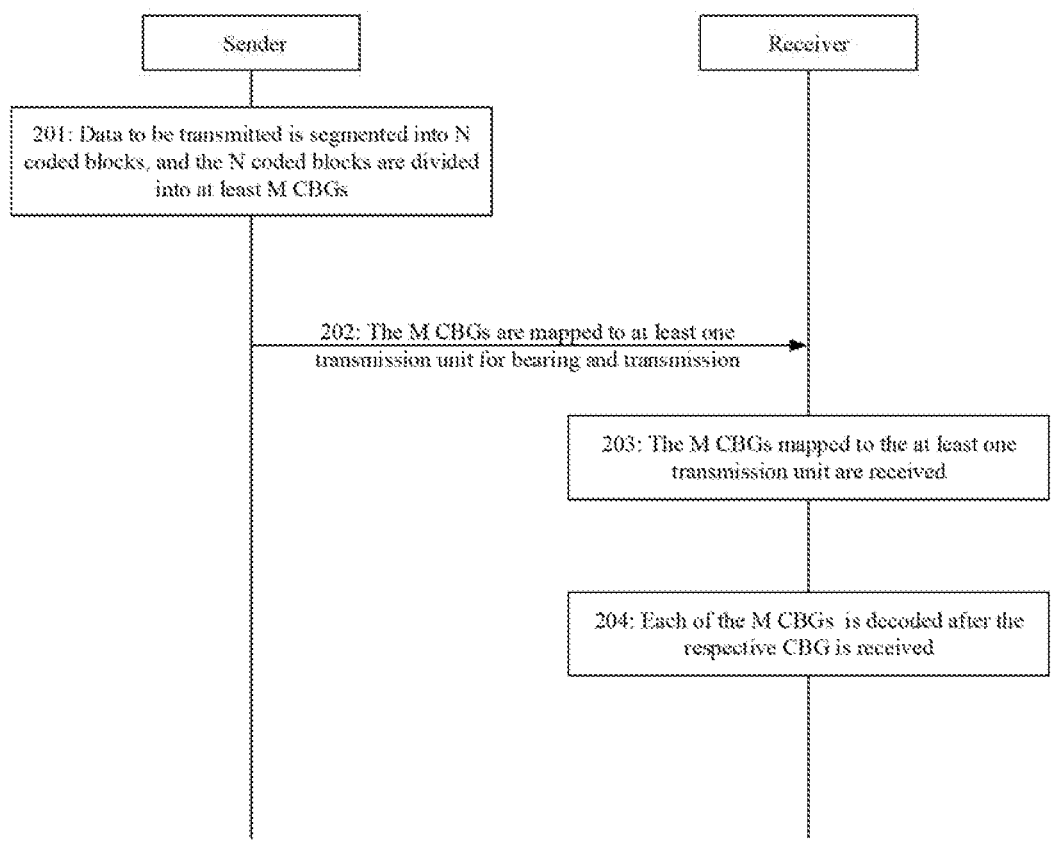
FIG. 2 illustrates a communication schematic diagram of a method for implementing data mapping and transmission according to an implementation of the disclosure.

FIG. 2 illustrates a flowchart of a method for implementing data mapping and transmission according to an implementation of the disclosure. The method is applied to a communication system including a sender and a receiver. The method includes the following operations.

At block 201, the sender segments data to be transmitted into N code blocks and divides the N code blocks into M code block groups (CBGs). Herein, a difference between the numbers of the code blocks in any two CBGs is less than or equal to a preset value N and M are positive integers. N is greater than or equal to M, and M is greater than or equal to 2.

In at least one alternative embodiment, the preset value is 1. The preset value may be set by the system or set by a user. There are no limits made herein.

At block 202, the sender maps the M CBGs to at least one transmission unit for bearing and transmission. The M CBGs include a first CBG and a second CBG. A value of a parameter of information amount of the first CBG and a value of a parameter of information amount of the second CBG satisfy a preset condition. The at least one transmission unit includes a first physical resource corresponding to the first CBG and a second physical resource corresponding to the second CBG. The first physical resource is ahead of the second physical resource in time domain.

Herein, the "ahead of" may refer to that the entire first physical resource is ahead of the second physical resource in time domain, and may also refer to that part of the first physical resource including a starting time point is ahead of the second physical resource in time domain.

At block 203, a receiver receives the M CBGs mapped to the at least one transmission unit. The CBGs are obtained by dividing the N code blocks. The N code blocks are obtained by segmenting the data to be transmitted. The difference between the numbers of the code blocks in any two CBG is less than or equal to the preset value. The M CBGs at least include the first CBG and the second CBG. A value of a parameter of information amount of the first CBG and a value of a parameter of information amount of the second CBG satisfy a preset condition. The at least one transmission unit includes the first physical resource corresponding to the first CBG and the second physical resource corresponding to the second CBG. The first physical resource is ahead of the second physical resource in time domain. N and M are positive integers. N is greater than or equal to M, and M is greater than or equal to 2.

At block 204, the receiver decodes each of the M CBGs after the respective CBG is received.

In the implementations of the disclosure, the data to be transmitted in a communication system is segmented into the M CBGs, and the M CBGs are mapped to M physical resources for hearing and transmission. The M physical resources at least include the first physical resource corresponding to the first CBG and the second physical resource corresponding to the second CBG. Since the value of the parameter of information amount of the first CBG is greater than the value of the parameter of information amount of the second CBG and the first physical resource is ahead of the second physical resource in time domain, the physical resource corresponding to a CBG with a longer decoding delay in the M continuous CBGs is ahead of the physical resource corresponding to another CBG with a shorter decoding delay in the M continuous CBGs in time domain. Correspondingly, the receiver may receive the CBG with the relatively long decoding delay earlier and the decoding delay of the CBG may be balanced out by transmission delays of as many as possible subsequent CBGs. Therefore, an overall reception delay of the data is reduced, and improvement of data transmission efficiency of the communication system and improvement of a user experience are facilitated.

In at least one alternative embodiment, the parameter of information amount may include at least one of:

a number of the code blocks in the CEO, a modulation and code level of the code blocks in the CBG, a code rate of the code blocks in the CBG, or a number of initial bits in the CBG.

In at least one alternative embodiment, the preset condition may include that the value of the parameter of information amount of the first CBG is greater than the value of the parameter of information amount of the second CBG.

In at least one alternative embodiment, the operation, that the M CBGs are mapped to the at least one transmission unit for bearing and transmission may include that: an information amount of each of the M CBGs is determined, and a reference decoding delay of each CBG is determined based on an information amount of the CBG; a time-domain position of a physical resource for each CBG is determined based on the reference decoding delay of each CBG and preset correspondences between reference decoding delays and time-domain positions of physical resources, the physical resource being a transmission resource configured to bear the CBG in the at least one transmission unit; and each CBG is born and transmitted on the physical resource corresponding to the CBG based on the time-domain position of the physical resource for each CBG.

Herein, the correspondences may be directly proportional correspondences. The directly proportional correspondences refer to that, if the reference decoding delay of a CBG is longer, the physical resource corresponding to the CBG is ahead of a physical resource corresponding to another CBG having a shorter reference decoding delay in time domain, which may also be understood as that the time-domain position of the physical resource corresponding to the CBG is in the front of a time domain position of a physical resource corresponding to another CBG having a shorter reference decoding delay.

In at least one alternative embodiment, the number of the code blocks in the first CBG is greater than the number of the code blocks in the second CBG.

It can be seen that, in the example, for the CBGs including different numbers of code blocks, during resource mapping, the sender may preferably map the CBG including a larger number of code blocks to the physical resource of which the time-domain position is ahead. Therefore, the decoding delay of the CBG may be balanced out by the transmission delays of as many as possible subsequent CBGs, thereby facilitating reduction of the whole data reception delay, improvement of the data transmission efficiency and improvement of the user experience.

In at least one alternative embodiment, the number of the code blocks in the first CBG is equal to the number of the code blocks in the second CBG, and the modulation and code level for the code blocks in the first CBG is higher than the modulation and code level for the code blocks in the second CBG.

In the example, for multiple CBGs including the same number of code blocks, during resource mapping, the sender may preferably map the CBG for which a relatively high modulation and code level is adopted, to the physical resource of which the time-domain position is ahead. Therefore, the decoding delay of the CBG may be balanced out by the transmission delays of as many as possible subsequent CBGs, thereby facilitating reduction of the whole data reception delay, improvement of the data transmission efficiency and improvement of the user experience.

In at least one alternative embodiment, the number of the code blocks in the first CBG is equal to the number of the code blocks in the second CBG, and the code rate of the code blocks in the first CBG is higher than the code rate of the code blocks in the second CBG.

In the example, for multiple CBGs including, the same number of code blocks, during resource mapping, the sender may preferably map the CBG of which the code rate is relatively high to the physical resource of which the time-domain position is ahead. Therefore, the decoding delay of the CBG may be balanced out by the transmission delays of as many as possible subsequent CBGs, thereby facilitating reduction of the whole data reception delay, improvement of the data transmission efficiency and improvement of the user experience.

In at least one alternative embodiment, the number of the code blocks in the first CBG is equal to the number of the code blocks in the second CBG, and a number of initial bits of the code blocks in the first CBG is greater than a number of initial bits of the code blocks in the second CBG.

In the example, for multiple CBGs including the same number of code blocks, during resource mapping, the sender may preferably map the CBG of which the number of initial bits is relatively large to the physical resource of which the time-domain position is ahead. Therefore, the decoding delay of the CBG may be balanced out by the transmission delays of as many as possible subsequent CBGs, thereby facilitating reduction of the whole data receiving delay, improvement of the data transmission efficiency and improvement of the user experience.

In at least one alternative embodiment, the transmission unit represents a transmission resource specified by the communication system. The physical resource further includes a frequency-domain resource or a code-domain resource.

The implementation of the disclosure will specifically be described below in combination with specific application scenarios.

Figure 3A:
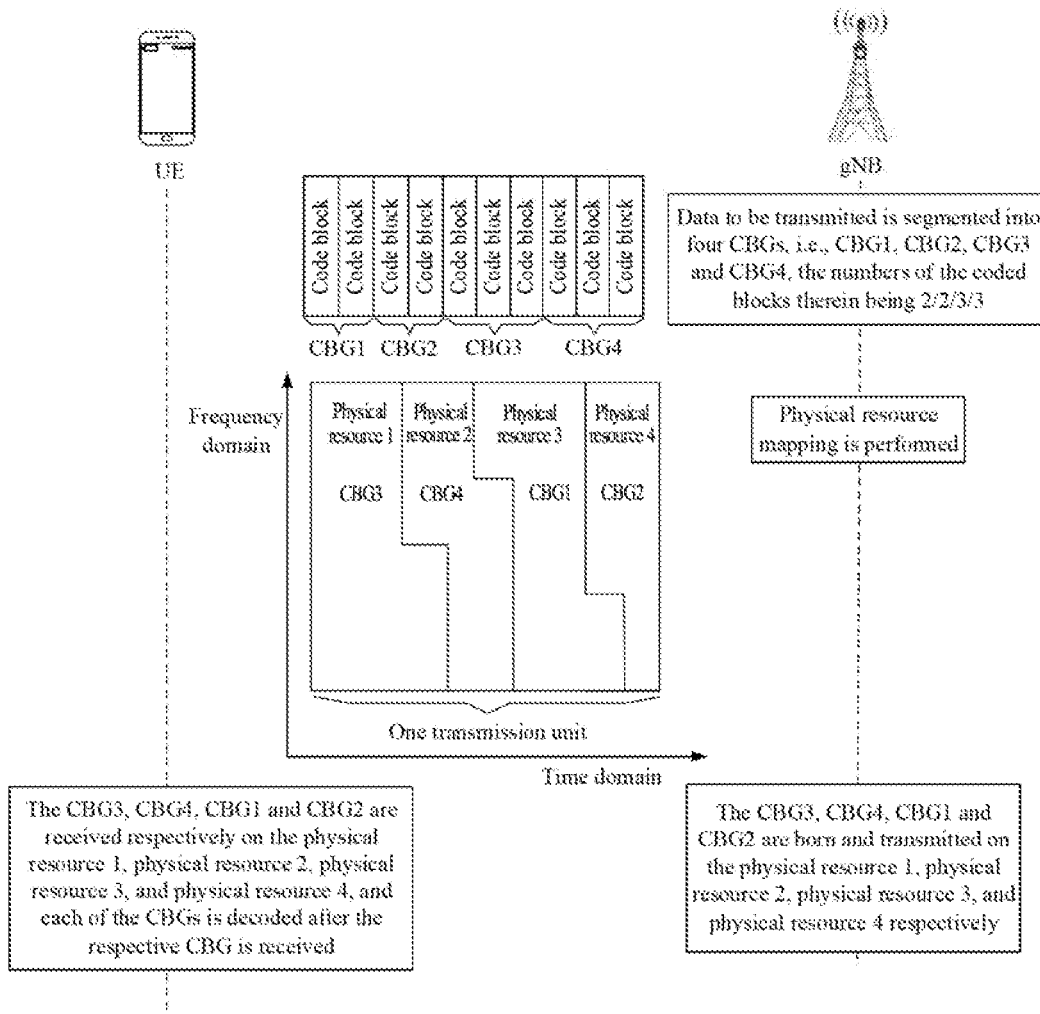
FIG. 3A illustrates a schematic diagram of implementing data mapping and transmission in a 5G NR system according to an implementation of the disclosure.

As illustrated in FIG. 3A, there is made such a hypothesis that the sender is a network device and the receiver is a terminal. The network device is a in a 5G NR system. The terminal is UE in the 5G NR system. The data to be transmitted is segmented into ten code blocks. The ten code blocks are divided into four CBGs. The four CBGs are CBG1, CBG2, CBG3 and CBG4. The numbers of the code blocks in the CBG1, CBG2, CBG3 and CBG4 are 2, 2, 3 and 3 respectively. During physical resource mapping, the gNB allocates a transmission unit for the four CBGs. Specifically, the NB maps CBG3 to a physical resource 1 of the transmission unit, maps CBG4 to a physical resource 2 of the transmission unit, maps CBG1 to a physical resource 3 of the transmission unit and maps CBG2 to a physical resource 4 of the transmission unit. The physical resource 1 is ahead of the physical resource 2 in time domain, the physical resource 2 is ahead of the physical resource 3 in time domain, and the physical resource 3 is ahead of the physical resource 4 in time domain. The gNB bears and transmits the CBG3, the CBG4, the CBG1 and the CBG2 respectively on the physical resource 1, the physical resource 2, the physical resource 3 and the physical resource 4. Correspondingly, the UE receives the CBG3, the CBG4, the CBG1 and the CBG2 respectively on the physical resource 1, the physical resource 2, the physical resource 3 and the physical resource 4, and decodes each of the 4 CBGs after the respective CBG is received.

Figure 3B:
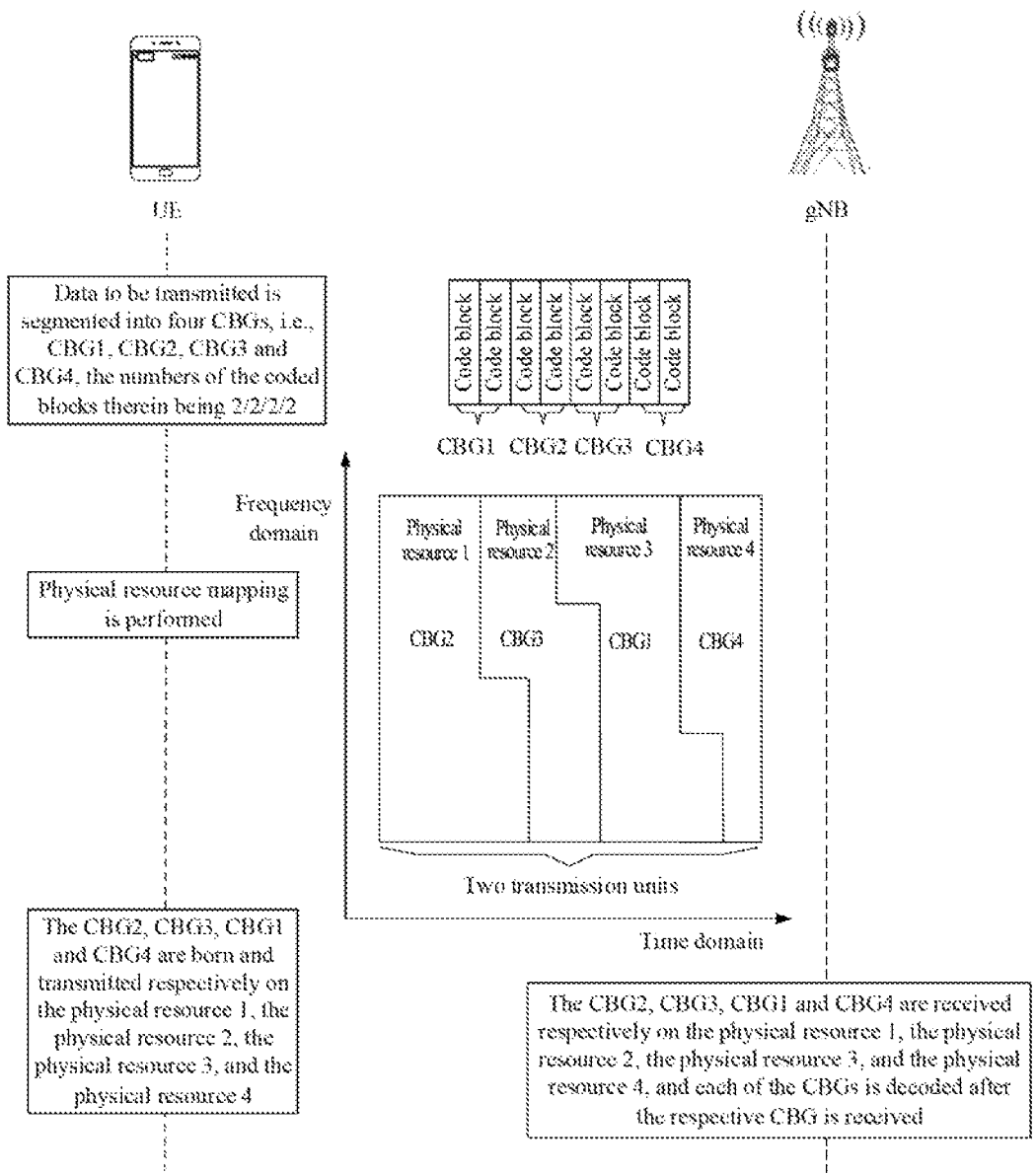
FIG. 3B illustrates another schematic diagram of implementing data mapping and transmission in a 5G NR system according to an implementation of the disclosure.

As illustrated in FIG. 3B, there is made such a hypothesis that the sender is a terminal and the receiver is a network device. The terminal is the UE in the 5G NR system. The network device is the gNB in the 5G NR system. The data to be transmitted is segmented into eight code blocks. The eight code blocks are divided into four CBGs. The four CBGs are CBG1, CBG2, CBG3 and CBG4. Each CBG includes two code blocks. Herein, a sequence of modulation and code levels for the code blocks is: CBG2>CBG3>CBG1>CBG4. During physical resource mapping, the terminal allocates two transmission units for the flits CBGs. Specifically, the terminal maps CBG2 to a physical resource 1 of the two transmission units, maps CBG3 to a physical resource 2 of the two transmission units, maps CBG1 to a physical resource 3 of the two transmission units and maps CBG4 to a physical resource 4 of the two transmission units. The physical resource 1 is ahead of the physical resource 2 in time domain, the physical resource 2 is ahead of the physical resource 3 in time domain, and the physical resource 3 is ahead of the physical resource 4 in time domain. The UE bears and transmits the CBG2, the CBG3, the CBG1 and the CBG4 respectively on the physical resource 1, the physical resource 2, the physical resource 3 and the physical resource 4. The gNB receives the CBG2, the CBG3, the CBG1 and the CBG4 respectively on the physical resource 1, the physical resource 2, the physical resource 3 and the physical resource 4, and decodes each of the 4 CBGs after the respective CBG is received.

Figure 4:
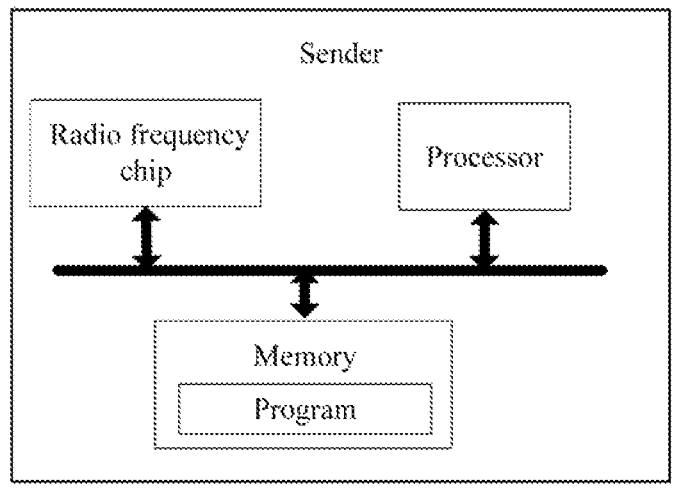
FIG. 4 illustrates a structure diagram of a sender according to an implementation of the disclosure.

Consistent with the implementation illustrated in FIG. 2, FIG. 4 illustrates a structure diagram of a sender according to an implementation of the disclosure. As illustrated in the FIG. 4, the sender includes a processor, a memory, a radio frequency chip and a program. The program is stored in the memory and is configured to be executed by the processor. The program includes instructions configured to execute the following operations.

Data to be transmitted is segmented into N code blocks, and the N code blocks are divided into at least M CBGs. Herein, a difference between the numbers of the code blocks in any two CBGs is less than or equal to a preset value. N and M are positive integers. N is greater than or equal to M, and M is greater than or equal to 2.

The M CBGs are mapped to at least one transmission unit for bearing and transmission. The M CBGs include a first CBG and a second CBG. A value of a parameter of information amount of the first CBG and a value of a parameter of information amount of the second CBG satisfy a preset condition. The at least one transmission unit includes a first physical resource corresponding to the first CBG and a second physical resource corresponding to the second CBG. The first physical resource is ahead of the second physical resource in time domain.

In the implementation of the disclosure, the data to be transmitted in a communication system is divided into the M CBGs, and the M CBGs are mapped to M physical resources for bearing and transmission. The M physical resources include the first physical resource corresponding to the first CBG and the second physical resource corresponding to the second CBG. Since the value of the parameter of information amount of the first CBG is greater than the value of the parameter of information amount of the second CBG and the first physical resource is ahead of the second physical resource in time domain, the physical resource corresponding to a CBG with a longer decoding delay in the M continuous CBGs is ahead of a physical resource corresponding to another CBG with a shorter decoding delay in the M continuous CBGs in time domain. Correspondingly, the receiver may receive the CBG with the relatively long decoding delay earlier. Thus, the decoding delay of the CBG may be balanced out by transmission delays of as many as possible subsequent CBGs. Therefore, an overall reception delay of the data is reduced, and improvement of data transmission efficiency of the communication system and improvement of a user experience are facilitated.

In at least one alternative embodiment, the parameter of information amount may include at least one of the number of the code blocks in the CBG, a modulation and code level for the code blocks in the CBG, a code rate of the code blocks in the CBG, or a number of initial bits in the CBG.

In at least one alternative embodiment, the preset condition may include that the value of the parameter of information amount of the first CBG is greater than the value of the parameter of information amount of the second CBG.

In at least one alternative embodiment, the number of the code blocks in the first CBG is greater than the number of the code blocks in the second CBG.

In at least one alternative embodiment, the number of the code blocks in the first CBG is equal to the number of the code blocks in the second CBG, and the modulation and code level for the code blocks in the first CBG is higher than the modulation and code level for the code blocks in the second CBG.

In at least one alternative embodiment, the number of the code blocks in the first CBG is equal to the number of the code blocks in the second CBG, and the code rate of the code blocks in the first CBG is higher than the code rate of the code blocks in the second CBG.

In at least one alternative embodiment, the number of the code blocks in the first CBG is equal to the number of the code blocks in the second CBG, and a number of initial bits of the code blocks in the first CBG is greater than a number of initial bits of the code blocks in the second CBG.

In at least one alternative embodiment, the transmission unit represents a transmission resource specified by a communication system.

The physical resource further includes a frequency-domain resource or a code-domain resource.

Figure 5:
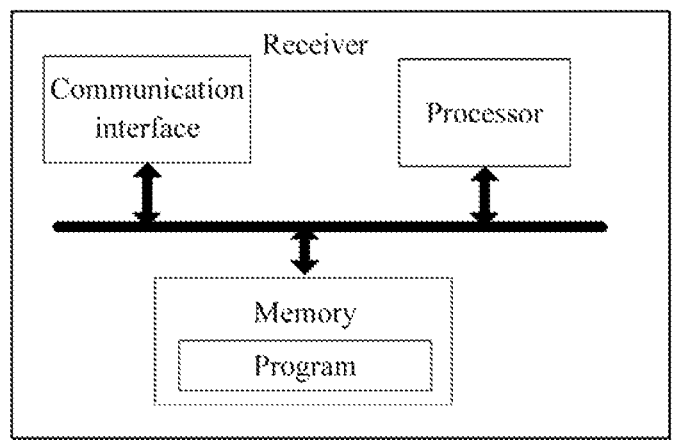
FIG. 5 illustrates a structure diagram of a receiver according to an implementation of the disclosure.

Consistent with the implementation illustrated in FIG. 2, FIG. 5 illustrates a structure diagram of a receiver according to an implementation of the disclosure. As illustrated in the FIG. 5, the receiver includes a processor, a memory, a communication interface and a program. The program is stored in the memory and is configured to be executed by the processor. The program includes instructions configured to execute the following operations.

M CBGs mapped to at least one transmission unit are received. Herein, the M CBGs are obtained by dividing N code blocks. The N code blocks are obtained by segmenting data to be transmitted. A difference between the numbers of the code blocks in any two CBGs is less than or equal to a preset value. The M CBGs include a first CBG and a second CBG. A value of a parameter of information amount of the first CBG and a value of a parameter of information amount of the second CBG satisfy a preset condition. The at least one transmission unit includes a first physical resource corresponding to the first CBG and a second physical resource corresponding to the second CBG. The first physical resource is ahead of the second physical resource in time domain N and M are positive integers. N is greater than or equal to M, and M is greater than or equal to 2.

Each of the M CBGs is decoded after the respective CBG is received.

In the implementation of the disclosure, the data to be transmitted in a communication system is divided into the M CBGs, and the M CBGs are mapped to M physical resources for bearing and transmission. The M physical resources include the first physical resource corresponding to the first CBG and the second physical resource corresponding to the second CBG. Since the value of the parameter of information amount of the first CBG is greater than the value of the parameter of information amount of the second CBG and the first physical resource is ahead of the second physical resource in time domain, the physical resource corresponding to a CBG with a longer decoding delay in the M continuous CBGs is ahead of a physical resource corresponding to another CBG with a shorter decoding delay in the M continuous CBGs in time domain. Correspondingly, the receiver may receive the CBG with the relatively long decoding delay earlier. Thus, the decoding delay of the CBG may be balanced out by transmission delays of as many as possible subsequent CBGs. Therefore, an overall reception delay of the data is reduced, and improvement of data transmission efficiency of the communication system and improvement of a user experience are facilitated.

In at least one alternative embodiment, the parameter of information amount includes at least one of: the number of the code blocks in the CBG, a modulation and code level for the code blocks in the CBG, a code rate of the code blocks in the CBG or a number of initial bits in the CBG.

In at least one alternative embodiment, the preset condition may include that the value of the parameter of information amount of the first CBG is greater than the value of the parameter of information amount of the second CBG.

In at least one alternative embodiment, the number of the code blocks in the first CBG is greater than the number of the code blocks in the second CBG.

In at least one alternative embodiment, the number of the code blocks in the first CBG is equal to the number of the code blocks in the second CBG, and the modulation and code level for the code blocks in the first CBG is higher than the modulation and code level for the code blocks in the second CBG.

In at least one alternative embodiment, the number of the code blocks in the first CBG is equal to the number of the code blocks in the second CBG, and the code rate of the code blocks in the first CBG is higher than the code rate of the code blocks in the second CBG.

In at least one alternative embodiment, the number of the code blocks in the first CBG is equal to the number of the code blocks in the second CBG, and a number of initial bits of the code blocks in the first CBG is greater than a number of initial bits of the code blocks in the second CBG.

In at least one alternative embodiment, the transmission unit represents a transmission resource specified by the communication system. The physical resource further includes a frequency-domain resource or a code-domain resource.

The solutions of the implementations of the disclosure are introduced mainly from the perspective of interaction between the network elements. It can be understood that, for implementing the above functions, the sender and the receiver include corresponding hardware structures and/or software modules executing the functions. Those skilled in the art may easily realize that the units and algorithm operations of each example described in combination with the implementations disclosed in the disclosure may be implemented by hardware or a combination of the hardware and computer software in the disclosure. Whether a certain function is executed by the hardware or in a manner of driving the hardware by the computer software depends on specific applications and design constraints of the technical solutions. Professionals may realize the described functions for each specific application by use of different methods, but such realizations shall fall within the scope of the disclosure.

According to the implementations of the disclosure, functional waits of the sender and the receiver may be divided according to the abovementioned method examples. For example, each functional unit may be divided correspondingly to each function and two or more than two functions may also be integrated into a processing unit. The integrated unit may be implemented in a hardware form and may also be implemented in form of software program module. Division of the units in the implementation of the disclosure is schematic and only logical function division and another division manner may be adopted during practical implementation.

Figure 6:
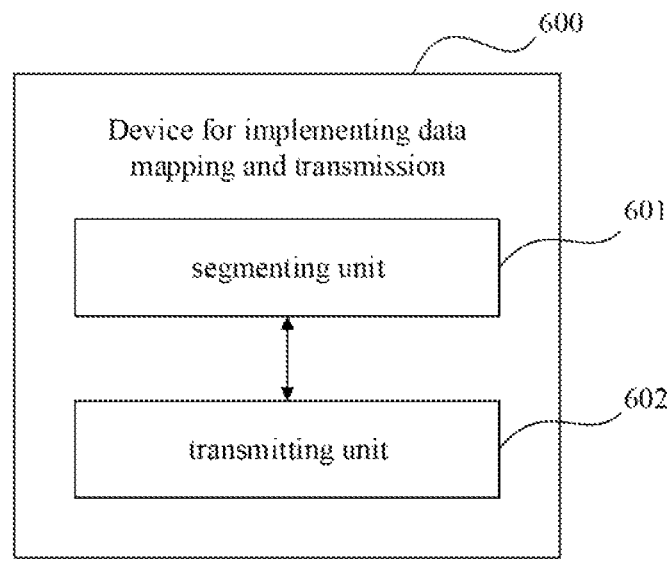
FIG. 6 illustrates a functional unit composition block diagram of a sender according to an implementation of the disclosure.

Under the condition that the integrated unit is adopted, FIG. 6 illustrates a possible functional unit composition block diagram of a device for implementing data mapping and transmission according to an implementation of the disclosure. The device for implementing data mapping and transmission is applied to the sender of the abovementioned implementations. The device 600 for implementing data mapping and transmission includes a segmenting unit 601 and a transmitting unit 602.

The segmenting unit 601 is configured to segment data to be transmitted into N code blocks and divide the N code blocks into M CBGs. Herein, a difference between the numbers of the code blocks in any two CBGs is less than or equal to a preset value N and M are positive integers. N is greater than or equal to M, and M is greater than or equal to 2.

The transmitting unit 602 is configured to map the M CBGs to at least one transmission unit for bearing and transmission. Herein, the M CBGs include a first CBG and a second CBG. A value of a parameter of information amount of the first CBG and a value of a parameter of information amount of the second CBG satisfy a preset condition. The at least one transmission unit includes a first physical resource corresponding to the first CBG and a second physical resource corresponding to the second CBG. The first physical resource is ahead of the second physical resource in time domain.

In at least one alternative embodiment, the parameter of information amount may include at least one of: the number of the code blocks in the CBG, a modulation and code level for the code blocks in the CBG, a code rate of the code blocks in the CBG, or a number of initial bits in the CBG.

In at least one alternative embodiment, the preset condition may include that the value of the parameter of information amount of the first CBG is greater than the value of the parameter of information amount of the second CBG.

In at least one alternative embodiment, the number of the code blocks in the first CBG is greater than the number of the code blocks in the second CBG.

In at least one alternative embodiment, the number of the code blocks in the first CBG is equal to the number of the code blocks in the second CBG, and the modulation and code level for the code blocks in the first CBG is higher than the modulation and code level for the code blocks in the second CBG.

In at least one alternative embodiment, the number of the code blocks in the first CBG is equal to the number of the code blocks in the second CBG, and the code rate of the code blocks in the first CBG is higher than the code rate of the code blocks in the second CBG.

In at least one alternative embodiment, the number of the code blocks in the first CBG is equal to the number of the code blocks in the second CBG, and a number of initial bits of the code blocks in the first CBG is greater than a number of initial bits of the code blocks in the second CBG.

In at least one alternative embodiment, the transmission unit represents a transmission resource specified by the communication system. The physical resource further includes a frequency-domain resource or a code-domain resource.

Herein, the segmenting unit 601 may be a processor, and the transmission unit 602 may be a radio frequency chip and the like.

When the segmenting unit 601 is the processor and the transmission unit 602 is a radio frequency chip, the device for implementing data mapping and transmission in the implementation of the disclosure may be the sender illustrated in FIG. 4.

Figure 7:
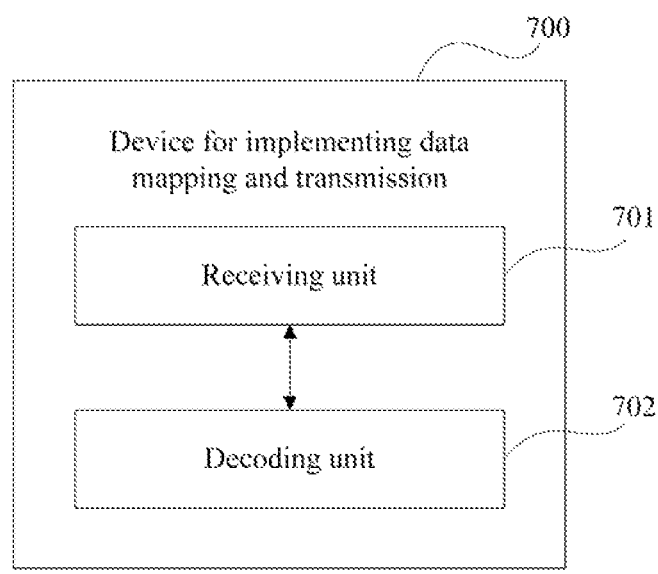
FIG. 7 illustrates a functional unit composition block diagram of a receiver according to an implementation of the disclosure.

Under the condition that the integrated unit is adopted, FIG. 7 illustrates a functional unit composition block diagram of a device for implementing data mapping and transmission according to an implementation of the disclosure. The device for implementing data mapping and transmission is applied to a receiver. The device 700 for implementing data mapping and transmission includes a receiving unit 701 and a decoding unit 702.

The receiving unit 701 is configured to receive M CBGs mapped to at least one transmission unit. The M CBGs are obtained by dividing N code blocks. The N code blocks are obtained by segmenting data to be transmitted. A difference between the numbers of the code blocks in any two CBGs is less than or equal to a preset value. The M CBGs include a first CBG and a second CBG. A value of a parameter of information amount of the first CBG and a value of parameter of information amount of the second CBG satisfy a preset condition. The at least one transmission unit includes a first physical resource corresponding to the first CBG and a second physical resource corresponding to the second CBG. The first physical resource is ahead of the second physical resource in time domain N and M are positive integers. N is greater than or equal to M, and M is greater than or equal to 2.

The decoding unit 702 is configured to decode each of the M CBGs after the respective CBG is received.

In at least one alternative embodiment, the parameter of information amount may include at least one of: the number of the code blocks in the CBG, a modulation and code level for the code blocks in the CBG, a code rate of the code blocks in the CBG or a number of initial bits in the CBG.

In at least one alternative embodiment, the preset condition may include that the value of the parameter of information amount of the first CBG is greater than the value of the parameter of information amount of the second CBG.

In at least one alternative embodiment, the number of the code blocks in the first CBG is greater than the number of the code blocks in the second CBG.

In at least one alternative embodiment, the number of the code blocks in the first CBG is equal to the number of the code blocks in the second CBG, and the modulation and code level for the code blocks in the first CBG is higher than the modulation and code level for the code blocks in the second CBG.

In at least one alternative embodiment, the number of the code blocks in the first CBG is equal to the number of the code blocks in the second CBG, and the code rate of the code blocks in the first CBG is higher than the code rate of the code blocks in the second CBG.

In at least one alternative embodiment, the number of the code blocks in the first CBG is equal to the number of the code blocks in the second CBG, and a number of initial bits of the code blocks in the first CBG is greater than a number of initial bits of the code blocks in the second CBG.

In at least one alternative embodiment, the transmission unit represents a transmission resource specified by the communication system. The physical resource further includes a frequency-domain resource or a code-domain resource.

Herein, the receiving unit 701 may be a communication interface, and the decoding unit 702 may be a processor.

When the receiving unit 701 is the communication interface and the decoding unit 702 is the processor, the device for implementing data mapping and transmission in the implementation of the disclosure may be the receiver illustrated in FIG. 5.

An implementation of the disclosure also provides a computer storage medium, which stores a computer program, the computer program enabling a computer to execute any operation in the implementations of the disclosure. The computer includes a receiver and a sender.

An implementation of the disclosure also provides a computer program product, which includes a computer program. The computer program may be operated to enable a computer to execute any operation in the implementations of the disclosure. The computer includes a receiver and a sender.

The operations of the method or algorithm described in the implementations of the disclosure may be implemented in a hardware manner, and may also be implemented in a manner of executing, by a processor, software. A software instruction may consist of a corresponding software module. The software module may be stored in a random access memory (RAM), a flash memory, a read only memory (ROM), an erasable programmable ROM (EPROM), an electrically EPROM (EEPROM), a register, a hard disk, a mobile hard disk, a compact disc-ROM (CD-ROM) or a storage medium in any other form well known in the art. An exemplary storage medium is coupled to the processor, thereby enabling the processor to read information from the storage medium and write information into the storage medium. Of course, the storage medium may also be a component of the processor. The processor and the storage medium may be located in an application specific integrated circuit (ASIC). In addition, the ASIC may be located in an access network device, a target network device or a core network device. Of course, the processor and the storage medium may also exist in the access network device, the target network device or the core network device as discrete components.

Those skilled in the an may realize that, in one or more abovementioned examples, all or part of the functions described in the implementations of the disclosure may be realized through software, hardware or any combination thereof. During implementation with the software, the implementations may be implemented completely or partially in form of computer program product. The computer program product includes one or more computer instructions. When the computer program instruction is loaded and executed on a computer, the flows or functions according to the implementations of the disclosure are completely or partially generated. The computer may be a universal computer, a dedicated computer, a computer network or another programmable device. The computer instruction may be stored in a computer storage medium or transmitted from one computer storage medium to another computer storage medium. For example, the computer instruction may be born and transmitted from a website, computer, server or data center to another website, computer, server or data center in a wired (for example, coaxial cable, optical fiber and digital subscriber line (DSL)) or wireless (for example, infrared, wireless and microwave) manner. The computer storage medium may be any available medium accessible for the computer or a data storage device, such as a server and a data center, including one or more integrated available media. The available medium may be a magnetic medium (for example, a floppy disk, a hard disk and a magnetic tape), an optical medium (for example, a digital video disc (DVD)), a semiconductor medium (for example, a solid state disk (SSD)) or the like.

The abovementioned specific implementations further describe the purposes, technical solutions and beneficial effects of the implementations of the disclosure in detail. It is to be understood that the above is only the specific implementations of the implementations of the disclosure and is not intended to limit the protection scope of the implementations of the disclosure. Any modifications, equivalent replacements, improvements and the like made on the basis of the technical solutions of the implementations of the disclosure shall fall within the protection scope of the implementations of the disclosure.

The invention claimed is:

1. A method for implementing data mapping and transmission, comprising:
   segmenting data to be transmitted into N code blocks, and dividing the N code blocks into M code block groups (CBGs), wherein a difference between numbers of code blocks in any two CBGs is less than or equal to 1, N and M are positive integers, N is greater than or equal to M, and M is greater than or equal to 3; and
   mapping the M CBGs to at least one transmission unit; and
   transmitting the M CBGs on the at least one transmission unit,
   wherein the M CBGs comprise a first CBG and at least two second CBGs, and a number of code blocks in the first CBG is greater than a number of code blocks in each of the at least two second CBGs; and
   wherein the at least one transmission unit comprises a first physical resource corresponding to the first CBG and a second physical resource corresponding to the at least two second CBGs, and the first physical resource is ahead of the second physical resource in time domain.

2. The method of claim 1, wherein the M CBGs comprise a first type of CBGs and a second type of CBGs, a number of code blocks in each CBG in the first type of CBGs being the same, and a number of code blocks in each CBG in the second type of CBGs being the same.

3. A method for implementing data mapping and transmission, comprising:
   receiving M code block groups (CBGs) mapped to at least one transmission unit, wherein the M CBGs are obtained by dividing N code blocks, the N code blocks are obtained by segmenting data to be transmitted, a difference between numbers of code blocks in any two CBGs is less than or equal to 1, the M CBGs comprise a first CBG and at least two second CBGs, and a number of code blocks in the first CBG is greater than a number of code blocks in each of the at least two second CBGs; the at least one transmission unit comprises a first physical resource corresponding to the first CBG and a second physical resource corresponding to the at least two second CBGs, and the first physical resource is ahead of the second physical resource in time domain, N and M are positive integers, N is greater than or equal to M, and M is greater than or equal to 3; and
   decoding each of the M CBGs after the respective CBG is received.

4. The method of claim 3, wherein the M CBGs comprise a first type of CBGs and a second type of CBGs, a number of code blocks in each CBG in the first type of CBGs being the same, and a number of code blocks in each CBG in the second type of CBGs being the same.

5. A sender, comprising a processor, a memory, a radio frequency chip and a program, wherein
   the memory is configured to store the program;
   the processor is configured to execute the program to:
      segment data to be transmitted into N code blocks, and divide the N code blocks into M code block groups (CBGs), wherein a difference between numbers of code blocks in any two CBGs is less than or equal to 1, N and M are positive integers, N is greater than or equal to M, and M is greater than or equal to 3; and
   the radio frequency chip is configured to:
      map the M CBGs to at least one transmission unit; and
      transmit the M CBGs on the at least one transmission unit;
   wherein the M CBGs comprise a first CBG and at least two second CBG, and a number of code blocks in the first CBG is greater than a number of code blocks in each of the at least two second CBGs; and
   wherein the at least one transmission unit comprises a first physical resource corresponding to the first CBG and a second physical resource corresponding to the at least two second CBGs, and the first physical resource is ahead of the second physical resource in time domain.

6. The sender of claim 5, wherein the M CBGs comprise a first type of CBGs and a second type of CBGs, a number of code blocks in each CBG in the first type of CBGs being the same, and a number of code blocks in each CBG in the second type of CBGs being the same.

7. A receiver, comprising a processor, a memory, a communication interface and a program, wherein
the memory is configured to store the program;
the communication interface is configured to:
receive M code block groups (CBGs) mapped to at least one transmission unit, wherein the M CBGs are obtained by dividing N code blocks, the N code blocks are obtained by segmenting data to be transmitted, a difference between numbers of code blocks in any two CBGs is less than or equal to 1, the M CBGs comprise a first CBG and at least two second CBGs, and a number of code blocks in the first CBG is greater than a number of code blocks in each of the at least two second CBGs; the at least one transmission unit comprises a first physical resource corresponding to the first CBG and a second physical resource corresponding to the at least two second CBGs, and the first physical resource is ahead of the second physical resource in time domain, N and M are positive integers, N is greater than or equal to M, and M is greater than or equal to 3; and
the processor is configured to decode each of the M CBGs after the respective CBG is received.

8. The receiver of claim 7, wherein the M CBGs comprise a first type of CBGs and a second type of CBGs, a number of code blocks in each CBG in the first type of CBGs being the same, and a number of code blocks in each CBG in the second type of CBGs being the same.

* * * * *